US006838026B2

(12) United States Patent
Miyakawa

(10) Patent No.: US 6,838,026 B2
(45) Date of Patent: Jan. 4, 2005

(54) METHOD FOR PRODUCING A SILICON NITRIDE FILTER

(75) Inventor: Naomichi Miyakawa, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/975,262

(22) Filed: Oct. 12, 2001

(65) Prior Publication Data

US 2002/0043735 A1 Apr. 18, 2002

(30) Foreign Application Priority Data

Oct. 13, 2000 (JP) ....................................... 2000-313955
Oct. 13, 2000 (JP) ....................................... 2000-313956

(51) Int. Cl.[7] ................................................ C04B 38/06
(52) U.S. Cl. .............................. 264/44; 264/42; 264/43
(58) Field of Search ............................... 264/42, 43, 44

(56) References Cited

U.S. PATENT DOCUMENTS 5,326,512 A 7/1994 Stillwagon et al.
5,688,728 A * 11/1997 Niwa et al. .................... 501/80
5,753,573 A 5/1998 Rorabaugh et al.
5,783,297 A * 7/1998 Wise et al. .............. 428/304.4
5,833,917 A * 11/1998 Watanabe et al. ........... 264/683
5,902,429 A * 5/1999 Apte et al. ............... 156/89.28

FOREIGN PATENT DOCUMENTS

EP 0 712 820 5/1996

* cited by examiner

*Primary Examiner*—Sean Vincent
(74) *Attorney, Agent, or Firm*—Oblon, Spivak, McClelland, Maier & Neustadt, P.C.

(57) ABSTRACT

A method for producing a silicon nitride filter by heat-treating in nitrogen green body of from 35 to 90 mass % of silicon nitride particles having an average particle diameter of from 1 to 30 $\mu$m, from 5 to 60 mass % of a pore-forming agent and from 0.1 to 5 mass % of metal oxide particles, provided that the total amount of the silicon nitride particle , the pore-forming agent and the metal oxide particles is at least 90 mass %, to form a porous product.

4 Claims, No Drawings

METHOD FOR PRODUCING A SILICON NITRIDE FILTER

BACKGROUND OF THE INVENTION

1. Field of the Invention

The present invention relates to a method for producing a silicon nitride filter suitable for removing dust, etc. contained in a high temperature exhaust gas.

2. Description of the Background

Silicon nitride has excellent characteristics with respect to heat resistance, corrosion resistance, chemical resistance, strength, etc., and is expected to be useful as a filter for dust arresting or dust removing in a high temperature or corrosive environment, or as a filter for cleaning the exhaust gas from a diesel engine. Methods for producing such silicon nitride filters have been proposed.

For example, JP-A-6-256069 proposes a method which comprises mixing coarse silicon nitride particles and a glass powder, followed by molding and baking. However, such a method wherein a low melting point material is added as a binder, has a problem that the heat resistance of silicon nitride will be substantially impaired. Further, JP-A-7-187845 and JP-A-8-59364 propose methods wherein a mixture of silicon nitride particles and an organic silicon compound, and a mixture of silicon nitride particles and a polysilazane, are used, respectively, as starting materials, and molded products are likewise baked. However, an organic silicon compound such as a polysilazane is usually expensive, and the methods of using such expensive materials have a problem with respect to the production cost and the availability of the starting materials.

On the other hand, as a method for obtaining a silicon nitride filter by using inexpensive metal silicon particles instead of silicon nitride particles and carrying out nitriding treatment, JP-A-1-188479 proposes a method to obtain a filter having a nitriding ratio of silicon nitride particles of at most 50%, by using as a starting material, a mixed powder comprising metal silicon particles and silicon nitride particles. However, in this method, the nitriding ratio of the silicon nitride particles is at most 50%, whereby there will be a substantial amount of metal silicon particles remaining in the silicon nitride sintered product without being nitrided, whereby the excellent heat resistance and corrosion resistance of silicon nitride are likely to be impaired.

SUMMARY OF THE INVENTION

It is an object of the present invention to provide a method for producing a silicon nitride filter having high strength and being most suitable for arresting and removing dusts, using silicon nitride particles as a starting material.

In a first aspect, the present invention provides a method for producing a silicon nitride filter, which comprises heat-treating in nitrogen a green body comprising from 35 to 90 mass % of silicon nitride particles having an average particle diameter of from 1 to 30 μm, from 5 to 60 mass % of a pore-forming agent and from 0.1 to 5 mass % of metal oxide particles, provided that the total amount of the silicon nitride particles, the pore-forming agent and the metal oxide particles is at least 90 mass %, to form a porous product made substantially of silicon nitride.

In a second aspect, the present invention provides a method for producing a silicon nitride filter, which comprises heat-treating in nitrogen a green body comprising from 45 to 85 mass % of silicon nitride particles having an average particle diameter of from 1 to 30 μm, from 10 to 50 mass % of metal oxide hollow particles and from 0.1 to 5 mass % of metal oxide solid particles, provided that the total amount of the silicon nitride particles, the metal oxide hollow particles and the metal oxide solid particles is at least 90 mass %, to form a porous product made substantially of silicon nitride.

DETAILED DESCRIPTION OF THE PREFERRED EMBODIMENT

Now, the present invention will be described in detail with reference to the preferred embodiments.

In the method for producing a silicon nitride filter of the present invention (hereinafter referred to as the present production method), a green body comprising from 5 to 60 mass % (hereinafter referred to simply as %) of a pore-forming agent, from 35 to 90% of silicon nitride particles having an average particle diameter of from 1 to 30 μm and from 0.1 to 5% of metal oxide particles, is used.

In the present production method, the content of the pore-forming agent is from 5 to 60% in the green body. If the content is less than 5%, the proportion of pores to perform a filter function tends to be inadequate. On the other hand, if the content exceeds 60%, no adequate strength tends to be obtained, although the porosity of the filter becomes large. The content of the pore-forming agent is preferably from 15 to 40% in the green body, whereby the filter can be made to have high strength and a high porosity.

Further, if the pore-forming agent is spherical, pores to be formed, will also be spherical, whereby deterioration in strength can be suppressed even when the porosity is increased. Further, when the pore-forming agent is spherical, the average particle diameter is preferably from 20 to 200 μm. If the average particle diameter of the pore-forming agent is less than 20 μm, the average pore diameter of the silicon nitride filter obtainable after the heat treatment, will be at most 5 μm, such being undesirable. On the other hand, if it exceeds 200 μm, the average pore diameter of the silicon nitride filter obtainable after the heat treatment, tends to exceed 20 μm, such being undesirable as a filter for removing dust or the like.

The pore-forming agent is not particularly limited so long as it forms pores. The pore-forming agent may, for example, be one which flies upon e.g. decomposition during heat treatment, to form pores, or oxide hollow particles. The pore-forming agent is preferably organic polymer particles, particularly heat decomposable polymer particles, whereby it will be decomposed and dissipated during the heat treatment and thus leaves no residue in the sintered product, whereby the properties of the silicon nitride filter thereby obtainable, will not be impaired. The present production method wherein the pore-forming agent is organic polymer particles, will be hereinafter referred to as the present production method 1.

In the present production method 1, the organic polymer may, for example, be a polyvinyl alcohol, an acrylic resin, a vinyl acetate resin or cellulose. If the organic polymer particles added as the pore-forming agent will remain in a substantial amount as carbon without being sufficiently thermally decomposed during the temperature rise in heat treatment, silicon carbide is likely to form in the subsequent heat treating step, thus leading to clogging of pores, such being undesirable. From this viewpoint, it is preferred to use acrylic resin particles as the pore-forming agent, since it is readily thermally decomposable, and the amount remaining as carbon will be small. The average particle diameter of the organic polymer particles is preferably from 20 to 100 μm.

In the present production method, oxide hollow particles may be used as the pore-forming agent. The present production method wherein the pore-forming agent is oxide hollow particles, will be hereinafter referred to as the present production method 2.

As the metal oxide hollow particles (hereinafter referred to simply as hollow particles), any particles may be suitably used so long as they are metal oxide particles capable of forming pores during the heat treatment, but in the present invention, the metal oxide hollow particles refer to metal oxide particles having a porosity of at least 30%. If the porosity is less than 30%, the ability to form pores tends to be inadequate. The porosity of the hollow particles is preferably from 40 to 80%, more preferably from 50 to 70%.

The hollow particles preferably contain, as the main component, an oxide of Al and/or Si, since it is effective to increase the porosity due to gasification of the component, or to improve the oxidation resistance by solid solubilization of a part of the component.

The hollow particles may have a dense or porous outer skin, so long as they are hollow. Further, the hollow particles are preferably spherical particles on appearance, whereby they are readily available. However, they may be particles other than spherical particles, so long as they are hollow.

The average particle diameter of the hollow particles is preferably from 30 to 200 μm, whereby the porosity of the filter to be obtained, will be large, and the strength will also be secured. If the average particle diameter of the hollow particles is less than 30 μm, the contribution to formation of pores tends to decrease. On the other hand, if the average particle diameter exceeds 200 μm, the strength of the filter tends to be inadequate, such being undesirable.

The content of the hollow particles is preferably from 10 to 50% in the green body. If the content is less than 10%, the proportion of pores to perform the filter function, tends to be inadequate. On the other hand, if the content exceeds 50%, no adequate strength tends to be obtainable, although the porosity of the filter increases.

The silicon nitride particles to be used in the present production method, have an average particle diameter of from 1 to 30 μm. If the average particle diameter of the silicon nitride particles is less than 1 μm, the amount of absorption of moisture or oxygen of the external air e.g. during the preparation of the green body, increases and the amount of silicon dioxide formed by oxidation of silicon nitride particles tends to be too large. Further, if the average particle diameter of the silicon nitride particles exceeds 30 μm, spherical pores can not be formed as a final filter, whereby the strength characteristics will deteriorate. The average particle diameter of the silicon nitride particles is more preferably from 1 to 10 μm.

The purity of the silicon nitride particles is suitably selected depending upon the particular purpose and application.

The content of the silicon nitride particles is usually from 35 to 90% in the green body. If the content is less than 35%, it tends to be difficult to obtain a filter having high heat resistance while maintaining sufficient strength. On the other hand, if the content exceeds 90%, the content of the pore-forming agent becomes small, and the porosity can not be made sufficiently large. The content of the silicon nitride particles is preferably from 50 to 80% in the green body. In the present production method 2, the content of the silicon nitride particles is preferably from 45 to 85% in the green body.

As the metal oxide particles to be used in the present production method, it is preferred to employ particles containing, as the main component, an oxide of at least one metal selected from the group consisting of Al, Ca, Sr, Ba, Y, Mg and Yb, whereby a sintering aid effect can be obtained, and high strength can be secured. The metal oxide particles may be, in addition to the metal oxide particles themselves, an organic metallic compound which becomes metal oxide particles after thermal decomposition.

The metal oxide particles preferably have a fine particle size, and the average particle diameter is preferably at most 10 μm, whereby the particles can be dispersed uniformly in the filter in a small amount. By the addition of the metal oxide particles, the silicon nitride portion to form pores will have a dense structure, and the pores to be formed, will be spherical.

The content of the metal oxide particles is from 0.1 to 5%. If the content of the metal oxide particles is less than 0.1% in the green body, the structure of the silicon nitride matrix as a backbone can not be made sufficiently dense, whereby high strength can not be obtained. Further, if the content exceeds 5% in the green body, the heat resistance of silicon nitride tends to be impaired, such being undesirable.

In the present production method 2, the metal oxide particles are preferably metal oxide solid particles (hereinafter referred to simply as solid particles). In the present specification, the solid particles represent metal oxide particles having a porosity of less than 30%.

In the present production method 2, the green body preferably comprises from 45 to 85% of silicon nitride particles having an average particle diameter of from 1 to 30 μm, from 10 to 50% of the hollow particles, and from 0.1 to 5% of the solid particles.

In this production method, the total amount of the pore-forming agent, the silicon nitride particles and the metal oxide particles, is at least 90% in the green body. If the total amount of the pore-forming agent, the silicon nitride particles and the metal oxide particles, is less than 90% in the green body, it will be difficult to obtain a filter having the desired properties.

In the present production method, as a method for preparing a green body comprising the pore-forming agent, the silicon nitride particles and the metal oxide particles, a common ceramic-forming method such as press molding, extrusion molding or slip casting, may suitably be employed. Further, at the time of molding, an organic binder may be added separately from the pore-forming agent. As such an organic binder, an organic substance such as polyvinyl alcohol or its modified product, starch or its modified product, carboxymethyl cellulose, hydroxymethyl cellulose, polyvinyl pyrrolidone, an acrylic resin or an acrylic copolymer, a vinyl acetate resin or a vinyl acetate copolymer, may, for example, be employed. The amount of such an organic binder is preferably from 1 to 10 parts by mass per 100 parts by mass of the green body. Further, the pore-forming agent may serve also as a binder for the green body.

As a condition for the heat treatment of the above green body, the heat treatment is carried out in a nitrogen atmosphere. As a condition for heat treatment, it is preferred to maintain it in a nitrogen atmosphere at a temperature of from 1,450 to 1,800° C. If the temperature range is less than 1,450° C., sintering of the silicon nitride particles tends to hardly proceed, such being undesirable. On the other hand, if it exceeds 1,800° C., the silicon nitride particles tend to be decomposed, such being undesirable. In the present production method 2, it is preferred to maintain the green body in a nitrogen atmosphere at a temperature of from 1,600 to 1,800° C.

The retention time is preferably from 1 to 12 hours. If the retention time is less than 1 hour, bonding of the particles to one another may not sufficiently proceed. On the other hand, if it exceeds 12 hours, silicon nitride is likely to be decomposed especially at a high temperature, such being undesirable. The retention time is more preferably from 2 to 5 hours.

The temperature raising rate in the heat treatment is suitably selected depending upon the size, shape, etc. of the green body. However, in a dewaxing step, decomposed gas will be formed in a large amount, and the temperature raising rate is preferably from 50 to 200° C./hr.

Here, the nitrogen atmosphere is meant for an atmosphere comprising substantially nitrogen only and containing no oxygen. However, it may contain other inert gas. The nitrogen partial pressure is preferably at least 50 kPa.

The porosity of the silicon nitride filter obtained by the present production method is preferably from 30 to 80%. The porosity is measured by an Archimedean method. If the porosity is less than 30%, the pressure loss tends to be large, such being undesirable as a filter. On the other hand, if the porosity exceeds 80%, the strength tends to be low, such being undesirable as a filter.

The average pore diameter as measured by a mercury immersion method of the silicon nitride filter obtained by the present production method is preferably from 5 to 40 $\mu$m. If the average pore diameter is less than 5 $\mu$m, the pressure loss during the use of the filter tends to be large, such being undesirable. If the average pore diameter exceeds 40 $\mu$m, arresting and removing fine exhaust particles such as diesel particulates tend to difficult, such being undesirable. The average pore diameter is more preferably from 5 to 20 $\mu$m.

Now, the present invention will be described in further detail with reference to Examples (Examples 1 to 6, 9 and 14 to 16) and Comparative Examples (Examples 7, 8, 10 to 13, and 17 and 18). The pore characteristics were measured by a mercury porosimeter (Auto SCAN-33, tradename, manufactured by Yuasa Ionics K.K.), and the thermal expansion coefficient was measured by a differential thermal expansion measuring apparatus (tradename: TAS-100, manufactured by Rigaku K.K.) within a range of from room temperature to 1,000° C.

EXAMPLE 1

To 68 parts by mass of silicon nitride particles having an average particle diameter of 5 $\mu$m, 30 parts by mass of spherical acrylic resin particles having an average particle diameter of 20 $\mu$m and 2 parts by mass of powdery magnesium oxide particles were added, and using ethyl alcohol as a dispersing medium, mixing was carried out for two hours by ball-milling method. After drying, this mixed powder was filled in a press mold of 60 mm×60 mm and press-molded under a molding pressure of 19.6 MPa to obtain a green body having a thickness of 10 mm. This green body was heated from room temperature to 500° C. at a rate of 60° C./hr and from 500° C. to 1,760° C. at a rate of 400° C./hr and maintained at 1,760° C. for 4 hours for heat treatment in a nitrogen atmosphere in an atmosphere-controllable electric furnace.

The characteristics of the obtained sintered product were such that the porosity was 60%, and the average pore diameter was 8 $\mu$m. With respect to this sintered product, the thermal expansion coefficient was measured and found to be low at a level of $2.9\times10^{-6}$/° C. Further, from the sintered product, a bending test specimen having a size of 4 mm×3 mm×40 mm was cut out, and the three point bending strength with a span of 30 mm was measured at room temperature. The load applying rate was 0.5 mm/min. As a result, the bending strength was high at a level of 40 MPa. The structure of the sintered product was observed to be such that the silicon nitride matrix was dense, and spherical pores formed by the acrylic resin, were uniformly dispersed therein.

EXAMPLE 2

The operation was the same as in Example 1 except that the retention time at 1,760° C. was changed from 4 hours to one hour. The characteristics of the obtained sintered product were such that the porosity was 65%, the average pore diameter was 9.5 $\mu$m, and the thermal expansion coefficient was $3.0\times10^{-6}$/° C. Further, the three point bending strength at room temperature measured in the same manner as in Example 1, was 25 MPa. The structure of the sintered product was observed to be such that the silicon nitride matrix was dense, and spherical pores formed by the acrylic resin, were uniformly dispersed therein.

EXAMPLE 3

The operation was the same as in Example 1 except that the acrylic resin particles having an average particle diameter of 20 $\mu$m were changed to vinyl acetate resin particles having an average particle diameter of 60 $\mu$m. The characteristics of the obtained sintered product were such that the porosity was 59%, and the average pore diameter was 20 $\mu$m. Further, the three point bending strength at room temperature measured in the same manner as in Example 1, was 20 MPa. The structure of the sintered product was observed to be such that the silicon nitride matrix was dense, and spherical pores formed by the vinyl acetate resin particles, were uniformly dispersed therein.

EXAMPLE 4

The operation was the same as in Example 1 except that the amount of the silicon nitride particles was changed to 48 parts by mass, the amount of the acrylic resin particles was changed to 50 parts by mass, and the amount of the powdery magnesium oxide particles was changed to 2 parts by mass. The characteristics of the obtained sintered product were such that the porosity was 80%, the average pore diameter was 15 $\mu$m, and the thermal expansion coefficient was $3.1\times10^{-6}$/° C. Further, the three point bending strength at room temperature measured in the same manner as in Example 1, was 5 MPa. The structure of the sintered product was observed to be such that the silicon nitride matrix was dense, and spherical pores formed by the acrylic resin, were uniformly dispersed therein.

EXAMPLE 5

To 60 parts by mass of silicon nitride particles having an average particle diameter of 5 $\mu$m, 35 parts by mass of acrylic resin particles having an average particle diameter of 100 $\mu$m and 5 parts by mass of powdery yttrium oxide particles were added, and using ethyl alcohol as a dispersing medium, mixing was carried out for two hours by ball-milling method. After drying, this mixed powder was filled in a press mold of 60 mm×60 mm, and press-molded under a molding pressure of 19.6 MPa to obtain a green body having a thickness of 10 mm. This green body was heated from room temperature to 1,000° C. at a rate of 60° C./hr and from 1,000 to 1,700° C. at a rate of 400° C./hr and maintained at 1,700° C. for 4 hours for heat treatment in a nitrogen atmosphere in an atmosphere-controllable electric furnace.

The characteristics of the obtained sintered product were such that the porosity was 65%, the average pore diameter was 20 μm, and the thermal expansion coefficient was $3.1\times10^{-6}$/° C. Further, the three point bending strength at room temperature measured in the same manner as in Example 1, was 10.9 MPa. The structure of the sintered product was observed to be such that the silicon nitride matrix was dense, and spherical pores formed by the acrylic resin, were uniformly dispersed therein.

EXAMPLE 6

To 65 parts by mass of silicon nitride particles having an average particle diameter of 1.5 μm, 30 parts by mass of acrylic resin particles having an average particle diameter of 50 μm and 5 parts by mass of powdery spinel particles ($MgAl_2O_4$) were added, and using ethyl alcohol as a dispersing medium, mixing was carried out for two hours by ball-milling method. After drying, this mixed powder was filled in a press mold of 60 mm×60 mm, and press-molded under a molding pressure of 19.6 MPa to obtain a green body having a thickness of 10 mm. This green body was heated from room temperature to 500° C. at a rate of 60° C./hr and from 500 to 1,750° C. at a rate of 400° C./hr and maintained at 1,750° C. for two hours for heat treatment in a nitrogen atmosphere in an atmosphere-controllable electric furnace.

The characteristics of the obtained sintered product were such that the porosity was 60%, the average pore diameter was 12 μm, and the thermal expansion coefficient was $3.1\times10^{-5}$/° C. Further, the three point bending strength at room temperature measured in the same manner as in Example 1, was 10.8 MPa. The structure of the sintered product was observed to be such that the silicon nitride matrix was dense, and spherical pores formed by the acrylic resin, were uniformly dispersed therein.

EXAMPLE 7

The operation was the same as in Example 1 except that the metal oxide particles were not added. The characteristics of the obtained sintered product were such that the porosity was 75%, the average pore diameter was 12 μm, and the thermal expansion coefficient was $3.0\times10^{-6}$/° C. Further, the three point bending strength at room temperature measured in the same manner as in Example 1, was low at a level of 8 MPa. The structure of the sintered product was observed to be such that the silicon nitride matrix was porous, and spherical pores formed by the acrylic resin, were dispersed therein.

EXAMPLE 8

To 100 parts by mass of metal silicon particles having an average particle diameter of 50 μm, 30 parts by mass of acrylic resin particles having an average particle diameter of 50 μm were added, and using ethyl alcohol as a dispersing medium, mixing was carried out for two hours by ball-milling method. After drying, this mixed powder was filled in a press mold of 60 mm×60 mm, and press-molded under a molding pressure of 19.6 MPa to obtain a green body having a thickness of 10 mm. This green body was heated from room temperature to 500° C. at a rate of 60° C./hr and from 500 to 1,600° C. at a rate of 400° C./hr and maintained at 1,600° C. for 4 hours for heat treatment in a nitrogen atmosphere in an atmosphere-controllable electric furnace.

The characteristics of the obtained sintered product were such that the porosity was 60% and the average pore diameter was 20 μm. However, in the obtained sintered products, a substantial amount of silicon metal residue was observed, and its thermal expansion coefficient was high at a level of $4.0\times10^{-6}$/° C. The three point bending strength at room temperature measured in the same manner as in Example 1, of this sample, was 9 MPa.

EXAMPLE 9

To 68 parts by mass of silicon nitride particles having an average particle diameter of 5 μm, 30 parts by mass of alumina hollow particles (porosity: 50%) having an average particle diameter of 75 μm and 2 parts by mass of MgO solid particles having an average particle diameter of 2 μm, were added, and using ethanol as a dispersing medium, wet mixing was carried out for 30 minutes by ball-milling method. The mixture was finally dried.

The obtained mixed particles were filled in a press mold of 60 mm×60 mm, and uniaxially press-molded under a molding pressure of 20 MPa to obtain a green body. The green body was heated from room temperature to 1,000° C. at a rate of 100° C./hr and maintained at 1,000° C. for two hours and then heated from 1,000° C. to 1,760° C. at a rate of 300° C./hr and maintained at 1,760° C. for 4 hours for heat treatment in a nitrogen atmosphere in an electric furnace.

The characteristics of the obtained sintered product were such that the porosity was 50% and the average pore diameter was 20 μm. With respect to this porous product, the crystal phase was identified by X-rays, whereby only silicon nitride was observed. The structure of the porous product was observed to be such that the matrix portion was well densified, and spherical pores formed by the hollow particles were uniformly dispersed. With respect to this porous product, the thermal expansion coefficient was measured and found to be low at a level of $3.0\times10^{-6}$/° C. within a range of from room temperature to 1,000° C. Further, from the sintered product, a bending test specimen having a size of 4 mm×3 mm×40 mm was cut out, and the three point bending strength with a span of 30 mm was measured at room temperature. The load applying rate was 0.5 mm/min. As a result, the bending strength was high at a level of 70 MPa.

EXAMPLE 10

The operation was the same as in Example 9 except that in Example 9, the silicon nitride particles were changed from 68 parts by mass to 43 parts by mass, and the amount of the alumina hollow particles was changed from 30 parts by mass to 110 parts by mass. The obtained sintered product had a porosity of 85% and an average pore diameter of 45 μm. The structure of the porous product was observed to be such that the matrix portion was well densified, and spherical pores formed by hollow particles were uniformly dispersed. With respect to this porous product, the X-ray diffraction, the thermal expansion coefficient measurement and the three point bending strength measurement were carried out in the same manner as in Example 9. As a result, in the identification of the crystal phase, a peak of alumina was observed in addition to a peak of silicon nitride. Further, the thermal expansion coefficient was high at a level of $5.3\times10^{-6}$/° C. within a range of from room temperature to 1,000° C. The three point bending strength at room temperature was 3 MPa.

EXAMPLE 11

The operation was the same as in Example 9 except that in Example 9, the silicon nitride particles were changed from 68 parts by mass to 62 parts by mass, and the amount of the MgO solid particles was changed from 2 parts by mass to 8 parts by mass. The obtained sintered product had a porosity of 20% and an average pore diameter of 8 μm. With respect to this porous product, the X-ray diffraction, the thermal expansion coefficient measurement and the three point bending strength measurement were carried out in the same manner as in Example 9. As a result, in the identification of the crystal phase, a peak of spinel ($MgAl_2O_4$) was observed. Further, the thermal expansion coefficient was $4.0\times10^{-6}$/° C. within a range of from room temperature to 1,000° C. The three point bending strength at room temperature was 250 MPa. Further, the structure of the obtained sintered product was observed to be such that the matrix portion was well densified, and spherical pores formed by the hollow particles were uniformly dispersed, but a remarkable modification was observed. This is believed attributable to the fact that sintering was remarkably promoted by the formed liquid phase.

EXAMPLE 12

The operation was the same as in Example 9 except that in Example 9, the average particle diameter of the silicon nitride particles was changed from 5 μm to 50 μm. The obtained sintered product had a porosity of 75% and an average pore diameter of 40 μm, and sintering and densification of the structure did not proceed at all. With respect to this porous product, the X-ray diffraction, the thermal expansion coefficient measurement and the three point bending strength measurement were carried out in the same manner as in Example 9. As a result, in the identification of the crystal phase, peaks of silicon nitride and alumina were observed. Further, the thermal expansion coefficient was low at a level of $4.0\times10^{-6}$/° C. within a range of from room temperature to 1,000° C. The three point bending strength at room temperature was low at a level of 6 MPa.

EXAMPLE 13

The operation was the same as in Example 9 except that in Example 9, the silicon nitride particles were changed to metal silicon. With respect to this porous product, the X-ray diffraction, the thermal expansion coefficient measurement and the three point bending strength measurement were carried out in the same manner as in Example 9. As a result, the obtained sintered product had a porosity of 70% and an average pore diameter of 45 μm. Further, the crystal phase was identified, whereby a peak of silicon nitride was observed. With respect to this porous product, the thermal expansion coefficient was measured and found to be low at a level of $3.1\times10^{-6}$/° C. within a range of from room temperature to 1,000° C. However, the structure of the porous product was observed to be such that spherical pores formed by the hollow particles were uniformly dispersed in the porous silicon nitride structure, and the three point bending strength at room temperature was low at a level of 5 MPa.

EXAMPLE 14

To 72 parts by mass of silicon nitride particles having an average particle diameter of 5 μm, 35 parts by mass of silica hollow particles (porosity: 70%) having an average particle diameter of 100 μm and 3 parts by mass of $Y_2O_3$ solid particles were dry-mixed for 30 minutes by a mixer. The obtained mixed particles were uniaxially press-molded in the same manner as in Example 9 to obtain a green body. The green body was heated from room temperature to 500° C. at a rate of 100° C./hr and from 500° C. to 1,600° C. at a rate of 300° C./hr and maintained at 1,600° C. for 5 hours for heat treatment in a nitrogen atmosphere in an electric furnace.

The obtained sintered product were such that the porosity was 60% and the average pore diameter was 30 μm. The structure of the porous product was observed to be such that the matrix portion was well densified, and spherical pores formed by the hollow particles were uniformly dispersed. With respect to this porous product, the crystal phase was identified by X-rays, whereby only silicon nitride was observed. And, the thermal coefficient was measured and found to be low at a level of $3.1\times10^{-6}$/° C. within a range of from room temperature to 1,000° C. The three point bending strength at room temperature was high at a level of 60 MPa.

EXAMPLE 15

To 67 parts by mass of silicon nitride particles having an average particle diameter of 10 μm, 30 parts by mass of mullite type glass hollow particles (porosity: 50%) having an average particle diameter of 45 μm and 3 parts by mass of $Yb_2O_3$ solid particles, were added, and ethanol was further added as a dispersing medium, followed by wet mixing for 30 minutes by ball-milling method. The mixture was finally dried. The obtained mixed particles were uniaxially press-molded in the same manner as in Example 9 to obtain a green body. The green body was heated from room temperature to 1,100° C. at a rate of 200° C./hr and maintained at 1,100° C. for two hours and then heated from 1,100° C. to 1,700° C. at a rate of 60° C./hr and maintained at 1,700° C. for 5 hours for heat treatment in a nitrogen atmosphere in an electric furnace.

The characteristics of the obtained sintered product were such that the porosity was 50% and the average pore diameter was 15 μm. The structure of the porous product was observed to be such that the matrix portion was well densified, and spherical pores formed by the hollow particles were uniformly dispersed. With respect to this porous product, the thermal expansion coefficient was measured and found to be low at a level of $2.9\times10^{-6}$/° C. within a range of from room temperature to 1,000° C., and the three point bending strength at room temperature was 100 MPa.

EXAMPLE 16

To 63 parts by mass of silicon nitride particles having an average particle diameter of 20 μm, 35 parts by mass of silica-alumina hollow particles (porosity: 70%) having an average particle diameter of 50 μm and 2 parts by mass of $Y_2O_3$ solid particles, were added, followed by dry-mixing by a mixer. To 100 parts by mass of this mixed particles, 10 parts by mass of methyl cellulose and 10 parts by mass of deionized water were added and sufficiently kneaded by a kneader to obtain an extrusion molding material, followed by extrusion molding. The obtained extrusion molded green body was dried in a hot air dryer, and then heated from room temperature to 800° C. at a rate of 50° C./hr and maintained at 800° C. for two hours, then heated from 800° C. to 1,700° C. at a rate of 60° C./hr and maintained at 1,700° C. for 5 hours, for heat treatment in a nitrogen atmosphere in an electric furnace.

The obtained sintered product had a porosity of 60% and an average pore diameter of 18 μm. The structure of the porous product was observed to be such that the matrix portion was well densified, and spherical pores formed by the hollow particles were uniformly dispersed. Identification of the crystal phase was carried out by X-rays, whereby only silicon nitride was observed. Further, with respect to this porous product, the thermal coefficient was measured and found to be low at a level of $2.9\times10^{-6}$/° C. within a range of from room temperature to 1,000° C. The three point bending strength at room temperature was 60 MPa.

EXAMPLE 17

To 93 parts by mass of silicon nitride particles having an average particle diameter of 2 μm, 5 parts by mass of $Y_2O_3$ solid particles having an average particle diameter of 2 μm and 2 parts by mass of aluminum oxide solid particles having an average particle diameter of 1.5 μm, were added. Further, 50 parts by mass of deionized water and 0.1 part by mass of polycarboxylic acid type dispersing agent to the particles, were added to prepare a slurry. A polyurethane foamed resin body of 60 mm×60 mm×30 mm was dipped in the slurry and deaerated under vacuum, whereupon the polyurethane foamed resin body was taken out and dried.

After the drying, it was sintered in a nitrogen atmosphere at 1,800° C. for 4 hours in an electric furnace. After the sintering, the obtained silicon nitride filter had a porosity of 75%, but large pores having an average pore diameter of 100 μm, were formed, and the three point strength at room temperature was also low at a level of 8 MPa. Further, identification of the crystal phase was carried out by the X-ray diffraction, whereby a peak of silicon carbide was observed in addition to a peak of silicon nitride.

EXAMPLE 18

Into toluene, 100 parts by mass of silicon nitride particles having an average particle diameter of 1 μm and 300 parts by mass of polysilazane were added and thoroughly stirred to obtain a slurry. The prepared slurry was dried, then the obtained particles were pulverized, and further, the particle size was adjusted to obtain molding particles. The molding particles were uniaxially press-molded in the same manner as in Example 9, and then subjected to isostatic pressing (CIP) under 100 MPa. After the molding, it was heated from room temperature to 500° C. at a rate of 6° C./hr and from 500° C. to 1,200° C. at a rate of 300° C./hr and maintained at 1,200° C. for 6 hours, and then further heated from 1,200° C. to 1,400° C. at a rate of 100° C./hr and maintained at 1,400° C. for 4 hours, for heat treatment.

The obtained sintered product had a porosity of 87% and an average pore diameter of 35 μm. Cracks of about 10 μm were present at various portions of the sintered product. With respect to this porous product, identification of the crystal phase was carried out by X-rays, whereby the presence of silicon nitride and mullite was observed. With respect to this porous product, the three point bending strength at room temperature was measured and found to be low at a level of 5 MPa.

By the present production method, a silicon nitride filter suitable for dust arresting or dust removing can easily be produced. The silicon nitride filter obtained by the present invention has an average pore diameter which is most suitable for arresting diesel particulates, and the porosity is larger than the conventional product, and yet, the strength is sufficient, and corrosion resistance is excellent. Accordingly, when it is used for removal of diesel particulates, it presents a diesel particulate filter which has a high particulate arresting rate and which is excellent also in durability.

The entire disclosures of Japanese Patent Application No. 2000-313955 filed on Oct. 13, 2000 and Japanese Patent Application No. 2000-313956 filed on Oct. 13, 2000 including specifications, claims and summaries are incorporated herein by reference in their entireties.

What is claimed is:

1. A method for producing a silicon nitride filter, which comprises:

heat-treating, in an atmosphere consisting essentially of nitrogen or consisting essentially of a combination of an inert gas and nitrogen in which the partial pressure of nitrogen is at least 50 kPa, a green body comprising:

from 35 to 90 wt % of silicon nitride particles having an average particle diameter of from 1 to 3 μm, from 5 to 60 wt % of a pore-forming agent of spherical organic polymer particles selected from the group consisting of a polyvinyl alcohol, an acrylic resin, a vinyl acetate resin or cellulose ranging in size from 20 to 100 μm and from 0.1 to 5 wt % of metal oxide solid particles, provided that the total amount of the silicon nitride particles, the pore-forming agent and the metal oxide particles is at least 90 wt %, to form a product having a porosity ranging from 30 to 80% and an average pore diameter as measured by a mercury immersion method ranging from 5 to 40 μm that effectively filters particulate matter from diesel fuel.

2. The method for producing a silicon nitride filter according to claim 1, wherein the metal oxide particles contain, as the main component, an oxide of at least one metal selected from the group consisting of Al, Ca, Sr, Ba, Y, Mg and Yb.

3. The method for producing a silicon nitride filter according to claim 1, wherein the average pore diameter as measured by a mercury immersion method of the filter is from 5 to 20 μm.

4. The method for producing a silicon nitride filter according to claim 1, wherein the heat-treating conditions are such that the green body is maintained in a nitrogen atmosphere at a temperature within a range of from 1,450 to 1,800° C. for from 1 to 12 hours to carry out the heat treatment.

* * * * *